US012559660B2

(12) United States Patent
Kawamoto et al.

(10) Patent No.: US 12,559,660 B2
(45) Date of Patent: *Feb. 24, 2026

(54) COLD STORAGE MATERIAL, REFRIGERATOR, DEVICE INCORPORATING SUPERCONDUCTING COIL, AND METHOD OF MANUFACTURING COLD STORAGE MATERIAL

(71) Applicant: Niterra Materials Co., Ltd., Yokohama (JP)

(72) Inventors: Takahiro Kawamoto, Kawasaki (JP); Tomoko Eguchi, Yokohama (JP); Tomohiro Yamashita, Yokohama (JP); Masaya Hagiwara, Yokohama (JP); Akiko Saito, Kawasaki (JP); Daichi Usui, Kawasaki (JP)

(73) Assignee: Niterra Materials Co., Ltd., Yokohama (JP)

( * ) Notice: Subject to any disclaimer, the term of this patent is extended or adjusted under 35 U.S.C. 154(b) by 123 days.

This patent is subject to a terminal disclaimer.

(21) Appl. No.: 17/900,637

(22) Filed: Aug. 31, 2022

(65) Prior Publication Data

US 2023/0002663 A1    Jan. 5, 2023

Related U.S. Application Data

(60) Division of application No. 17/211,376, filed on Mar. 24, 2021, and a continuation of application No. PCT/JP2019/037995, filed on Sep. 26, 2019.

(30) Foreign Application Priority Data

Sep. 28, 2018    (JP) ................................. 2018-185628

(51) Int. Cl.
*C09K 5/14*        (2006.01)
*F25B 21/00*      (2006.01)
(Continued)

(52) U.S. Cl.
CPC ................. *C09K 5/14* (2013.01); *F25B 21/00* (2013.01); *H01F 1/017* (2013.01); *B22F 9/08* (2013.01); *B22F 9/10* (2013.01); *C01G 37/006* (2013.01)

(58) Field of Classification Search
CPC ..... C09K 5/14; B22F 9/06; B22F 9/08; B22F 9/082; B22F 9/10; B22F 2009/0824;
(Continued)

(56) References Cited

U.S. PATENT DOCUMENTS 4,339,508 A * 7/1982 Tsuya ................... B22D 11/005
                                                                  148/403
4,615,846 A * 10/1986 Yoshino .................... B22F 9/10
                                                                  264/180
(Continued)

FOREIGN PATENT DOCUMENTS

CN        102383018 A    3/2012
CN        105957671 A    9/2016
(Continued)

OTHER PUBLICATIONS

Das et al., "Magnetization behaviour of RCu2Si2 (R=Tb, Dy, Ho, Er and Tm) in the paramagnetic state," Journal of Physics: Condensed Matter, 1994, vol. 6 (pp. L557-L560).
(Continued)

*Primary Examiner* — Matthew R Diaz
(74) *Attorney, Agent, or Firm* — Foley & Lardner LLP

(57) ABSTRACT

A cold storage material, which has a large specific heat and a small magnetization in an extremely low temperature region and has satisfactory manufacturability, is provided, and a method for manufacturing the same is provided. Further, a refrigerator having high efficiency and excellent cooling performance is provided by filling this refrigerator with the above-described cold storage material. Moreover, a
(Continued)

$$0.01mm \leqq \phi min < \phi max \leqq 1mm$$

$$1.0 \leqq M/A \leqq 5.0$$

device incorporating a superconducting coil capable of reducing influence of magnetic noise derived from a cold storage material is provided. The cold storage material of embodiments is a granular body composed of an intermetallic compound in which the $ThCr_2Si_2$-type structure 11 occupies 80% by volume or more, and has a crystallite size of 70 nm or less.

1 Claim, 7 Drawing Sheets

(51) Int. Cl.

| | | |
|---|---|---|
| *H01F 1/01* | (2006.01) | |
| *B22F 9/08* | (2006.01) | |
| *B22F 9/10* | (2006.01) | |
| *C01G 37/00* | (2006.01) | |

(58) Field of Classification Search
CPC ........ B22F 2009/0828; B22F 2009/084; B22F 2009/0848; B22F 2009/086; B22F 2009/0864; B22F 2009/0868; B22F 2009/0872; B22F 2009/0876; B22F 2009/088; B22F 2009/0892; H01F 1/01; H01F 1/012; H01F 1/015; H01F 1/017; C22C 1/04; C22C 1/0441
See application file for complete search history.

(56) References Cited

U.S. PATENT DOCUMENTS

| | | | | |
|---|---|---|---|---|
| 5,032,172 | A * | 7/1991 | Overfelt | B22F 9/008 148/513 |
| 5,186,765 | A * | 2/1993 | Arai | B22F 9/082 148/303 |
| 5,225,004 | A * | 7/1993 | O'Handley | B22F 9/008 148/540 |
| 5,334,262 | A * | 8/1994 | Sawa | H01F 1/15316 148/561 |
| 5,449,416 | A | 9/1995 | Arai et al. | |
| 5,654,115 | A * | 8/1997 | Hasebe | B22F 9/10 429/219 |
| 6,042,657 | A | 3/2000 | Okamura et al. | |
| 6,334,909 | B1 * | 1/2002 | Okamura | H01F 1/015 148/303 |
| 6,467,277 | B2 | 10/2002 | Okamura et al. | |
| 6,892,792 | B2 * | 5/2005 | Arai | H01F 1/0578 164/427 |
| 7,578,892 | B2 * | 8/2009 | Hirosawa | H01F 1/015 148/301 |
| 9,556,374 | B2 * | 1/2017 | Yamada | C09K 5/14 |
| 2001/0020495 | A1 | 9/2001 | Mei et al. | |
| 2010/0062162 | A1 | 3/2010 | Shabanova et al. | |
| 2014/0123682 | A1 | 5/2014 | Irie | |
| 2018/0114614 | A1 | 4/2018 | Lewis et al. | |
| 2019/0189314 | A1 * | 6/2019 | Sanada | H01F 1/0557 |
| 2021/0309904 | A1 | 10/2021 | Kawamoto et al. | |
| 2023/0002662 | A1 | 1/2023 | Kawamoto et al. | |

FOREIGN PATENT DOCUMENTS

| | | | |
|---|---|---|---|
| GB | 2 424 901 A | 11/2005 | |
| JP | H03-177083 A | 8/1991 | |
| JP | H06-101915 A | 4/1994 | |
| JP | H06-201205 A | 7/1994 | |
| JP | H09-014774 A | 1/1997 | |
| JP | 2609747 B1 | 5/1997 | |
| JP | 2609747 B2 | 5/1997 | |
| JP | 2013-189543 A | 9/2013 | |
| WO | WO-99/20956 A1 | 4/1999 | |
| WO | WO-2009/133049 A1 | 11/2009 | |
| WO | WO-2011/009904 A1 | 1/2011 | |
| WO | WO-2018/211766 A1 | 11/2018 | |
| WO | WO-2020/067356 A1 | 4/2020 | |

OTHER PUBLICATIONS

Omejec et al., "Magnetic Susceptibilities of ThM2X2 Compounds (M=Cr, Mn, Fe, Co, Ni and Cu; X=Si and Ge)," Zeitschrift fur anorganische und allgemeine Chemie, 1971, vol. 380 (pp. 111-117).

US Non-Final Office Action on U.S. Appl. No. 17/211,376 dated Nov. 8, 2023 (18 pages).

Dos Reis et al., "Magnetic and magnetocaloric properties of DyMn2Si2 compound with multiple magnetic phase transition", Journal of Magnetism and Magnetic Materials, vol. 424, Oct. 4, 2016, pp. 84-88.

Gondek, et. al., "Low Temperature Specific Heat and Magnetocaloric Effect in RCu2Ge2 (R=Dy Tm) Compounds", Acta Physica Polonica A, vol. 122, No. 2, 391, 2012, 3 pages.

Just et al., "On the coordination of ThCr2Si2 (BaAl4)-type compounds within the field of free parameters," Journal of Alloys and Compounds 232, 1996, 1-25.

Kumar et al., "Pressure-induced changes in the magnetic and magnetocaloric properties of RMn2Ge2 (R=Sm,Gd)," Physical Review B, 77, 224427, 2008.

Mo, et al., "Magnetic properties and magnetocaloric effect in the RCu2Si2 and RCu2Ge2 (R=Ho, Er) compounds", Journal of Applied Physics, vol. 115, No. 073905, Feb. 21, 2014, 7 pages.

Mukherjee et al., "Ferromagnetic feature from Mn near room temperature in the fine particles of GdMn2Ge2 and TbMn2Ge2," EPL, 90, 2010, 17007.

Non-Final Office Action on U.S. Appl. No. 17/211,376 dated Aug. 30, 2022.

Takeda, et. al., "Calorimetric Study in Single Crystalline RCu2Si2 (R Rare Earth)", Journal of the Physical Society of Japan, vol. 77, No. 10, Oct. 2008, 104710, 12 pages.

Wada et al., "Magnetic phase transition and magnetocaloric effect of DyMn2Ge2," Journal of Magnetism and Magnetic Materials, 218, 2000, 203-210.

Yusuf, et al., "Magnetic properties and magnetocaloric effect in intermetallic compounds NdMn2—xCOxSi2", Journal of Applied Physics, vol. 111, No. 093914, May 7, 2012, 9 pages.

US Final Office Action on U.S. Appl. No. 17/211,376 dated Feb. 15, 2023 (12 pages).

US Final Office Action for U.S. Appl. No. 17/211,376 dated Feb. 21, 2024 (7 pages).

U.S. Appl. No. 18/784,460, Kawamoto, Takahiro.

Japanese Office Action issued on Oct. 1, 2024, corresponding to Japanese Patent Application No. 2023-154004 (12 pages).

US Non-Final Office Action for U.S. Appl. No. 17/900,629 dated Jul. 17, 2024 (18 pages).

Nüttgens et al., "Growth of CeCu2812 from a levitating melt using the Nacken Kyropoulos technique," Crystal Research and Technology, 1997, vol. 32, No. 8 (pp. 1073-1077).

US Final Office Action for U.S. Appl. No. 17/211,376 dated Jun. 17, 2025 (16 pages).

Baran et al., "Nature of magnetic phase transitions in TbCu2X2 (X=Si, Ge) and HoCu2Si2 compounds," Journal of Alloys and Compounds, 2010, vol. 507 (pp. 16-20).

Mccall et al., "Magnetic properties of RCo2Ge2 compounds (R=La, Ce, Pr, Nd, Sm, Gd, Tb, Dy, Ho, Er, Tm, Yb, Lu, and Y)", Journal of Applied Physics, Oct. 1973, vol. 44, No. 10 (pp. 4724-4726).

Sankar et al., "Magnetic properties of some rare earth silicides of the type RFe2Si2," AIP Conference Proceedings, 1976, vol. 34 (pp. 236-238).

US Final Office Action for U.S. Appl. No. 17/900,629 dated Jan. 13, 2025 (18 pages).

US Non-Final Office Action for U.S. Appl. No. 17/211,376 dated Jan. 13, 2025 (17 pages).

US Notice of Allowance for U.S. Appl. No. 17/900,629 dated Jul. 1, 2025 (11 pages).

(56) References Cited

OTHER PUBLICATIONS

US Notice of Allowance for U.S. Appl. No. 17/211,376 dated Sep. 30, 2025 (7 pages).

* cited by examiner

Th : La, Ce, Pr, Nd, Pm, Sm,
Eu, Gd, Tb, Dy, Ho, Er,
Tm, Yb, Lu, Sc, Y

Cr : Ti, V, Cr, Mn, Fe, Co, Ni,
Cu, Ru, Rh, Pd, Ir, Pt

Si : Si, Ge $0.01\text{mm} \leqq \phi\text{min} < \phi\text{max} \leqq 1\text{mm}$ $1.0 \leqq M/A \leqq 5.0$

| | CRYSTALLITE SIZE (nm) | VOLUME OF ThCr$_2$Si$_2$-BASED COMPOUND | PROPORTION OF PULVERIZED SAMPLE | PEAK TEMPERATURE OF SPECIFIC HEAT | PEAK VALUE OF SPECIFIC HEAT ( JK$^{-1}$cm$^{-3}$ ) |
|---|---|---|---|---|---|
| EXAMPLE 1 | 62.5 | 97% | 0.08% | 5.8K | 0.84 |
| EXAMPLE 2 | 47.7 | 100% | 0.02% | 5.8K | 0.85 |
| EXAMPLE 3 | 61.9 | 82% | 0.07% | 5.8K | 0.83 |
| EXAMPLE 4 | 62.6 | 99% | 0.03% | 9.6K | 1.21 |
| EXAMPLE 5 | 62.4 | 100% | 0.02% | 11.0K | 0.40 |
| EXAMPLE 6 | 62.5 | 97% | 0.08% | 19.9K | 0.35 |
| EXAMPLE 7 | 62.4 | 98% | 0.05% | 9.2K | 0.60 |
| COMPARATIVE EXAMPLE 1 | 76.5 | 58% | 1.00% | 5.8K | 0.23 |
| COMPARATIVE EXAMPLE 2 | 79.2 | 100% | 2.17% | 5.8K | 0.85 |
| COMPARATIVE EXAMPLE 3 | 90.4 | 100% | 3.22% | 5.8K | 0.85 |
| COMPARATIVE EXAMPLE 4 | 81.5 | 100% | 2.34% | 5.8K | 0.85 |
| COMPARATIVE EXAMPLE 5 | 87.3 | 100% | 3.01% | 5.8K | 0.85 |
| COMPARATIVE EXAMPLE 6 | 79.6 | 75% | 1.20% | 5.8K | 0.31 |
| COMPARATIVE EXAMPLE 7 | 77.4 | 80% | 1.20% | 9.6K | 0.97 |
| COMPARATIVE EXAMPLE 8 | 88.5 | 100% | 3.09% | 9.6K | 1.21 |
| COMPARATIVE EXAMPLE 9 | 78.1 | 85% | 2.10% | 11.0K | 0.34 |
| COMPARATIVE EXAMPLE 10 | 90.1 | 100% | 3.19% | 11.0K | 0.40 |
| COMPARATIVE EXAMPLE 11 | 77.9 | 86% | 2.01% | 19.9K | 0.30 |
| COMPARATIVE EXAMPLE 12 | 90.3 | 100% | 3.20% | 19.9K | 0.35 |
| COMPARATIVE EXAMPLE 13 | 76.5 | 79% | 1.95% | 9.2K | 0.47 |
| COMPARATIVE EXAMPLE 14 | 89.9 | 100% | 3.15% | 9.2K | 0.60 |

FIG. 8

COLD STORAGE MATERIAL, REFRIGERATOR, DEVICE INCORPORATING SUPERCONDUCTING COIL, AND METHOD OF MANUFACTURING COLD STORAGE MATERIAL

CROSS-REFERENCE TO RELATED APPLICATIONS

This application is a Divisional Application of U.S. application Ser. No. 17/211,376, filed Mar. 24, 2021, which is a Continuation Application of International App. No. PCT/JP2019/037995, filed on Sep. 26, 2019, which claims the benefit of priority from Japanese App. No. 2018-185628, filed on Sep. 28, 2018, the entire contents of which are incorporated herein by reference.

TECHNICAL FIELD

Embodiments relate to a cold storage material to be used at an extremely low temperature and a technique to which this cold storage material is applied.

BACKGROUND

A superconducting electromagnet is used in a magnetic resonance imaging (MRI) system, a heavy particle beam accelerator which are operated in an extremely low temperature environment of several tens of K or less. Usually, this extremely low temperature environment is realized by a cold storage type refrigerator represented by a Gifford-McMahon (GM) refrigerator.

Several types of cold storage materials, which have a large specific heat for each operating temperature region, are used in the refrigerators. In the GM refrigerators that are currently widely used, Cu mesh is used as the cold storage material for the first cold storage device, and spherical particles of Pb and Bi alloy are used as the cold storage material on the high-temperature side of the second cold storage device, and particles of rare earth compounds such as $Gd_2O_2S$ (GOS), $HoCu_2$, and $Er_3Ni$ are used as the cold storage material on the low-temperature side of the second cold storage device. Among such cold storage materials, GOS has a high specific heat characteristic in a temperature region near 5K.

In order to synthesize an oxide cold storage material such as GOS, a multi-step process such as synthesis of raw materials, granulation, sintering at a high temperature, and spherical finishing by polishing is required.

Many refrigerators configured to achieve extremely low temperatures are used to cool superconducting coils. Thus, when the magnetization of the cold storage material is large, the cold storage material receives a large force due to the magnetic field generated by the superconducting coil and problems such as damage to the shaft containing the cold storage material may occur, which reduces the reliability of the refrigerator. Although superconducting coils are used for MRI and the like as described above, when the magnetization of the cold storage material is large, noise may be included in images due to magnetic noise derived from the cold storage material. Hence, the magnetization of the cold storage material is required to be small.

In refrigerators such as a GM refrigerator, a pulse tube refrigerator, and a Stirling refrigerator, high-pressure working gas fluidly reciprocates through the gap between the cold storage materials packed in the cold storage device. Further, in a GM refrigerator and a Stirling refrigerator, the cold storage device filled with cold storage materials vibrates. Thus, the cold storage materials are required to have mechanical strength.

In terms of manufacturing cold storage materials, it is preferred to use intermetallic compounds that can be manufactured by a simple process of melt-solidification. An oxide cold storage material such as GOS require a multi-step manufacturing process such as synthesis of raw materials, granulation, sintering at a high temperature, and spherical finishing by polishing. $RCu_2X_2$ (R=Pr, Nd, Sm, Gd, Tb, Dy, Ho, Er, Tm, X=Si, Ge) is known to have a large specific heat at extremely low temperatures as a choice for the cold storage material of intermetallic compounds.

However, the $RCu_2X_2$ compound is produced by, for example, melting the raw materials under an arc melting method and then subjecting the obtained ingot to a uniform heat treatment at a high temperature for a long time (for example, at 800° C. for one week). When a high-temperature and long-time heat treatment process is required after melt-solidification as described above, its cost increases in the case of being applied to industrial mass production.

PRIOR ART DOCUMENT

Patent Document

[Patent Document 1] JP H09-014774 A
[Patent Document 2] JP H06-101915 A

Non-Patent Document

[Non-Patent Document 1] L. Gonedek, et. al., Acta Phys Pol A 122, 391 (2012).
[Non-Patent Document 1] Y. Takeda, et. al., Phys. Soc. Jpn. 77, 104710 (2008).

SUMMARY

Problems to be Solved by Invention

A cold storage material, which has a large specific heat and a small magnetization in an extremely low temperature region and has satisfactory manufacturability, is provided, and a method for manufacturing the same is provided. Further, a refrigerator having high efficiency and excellent cooling performance is provided by filling this refrigerator with the above-described cold storage material. Moreover, a device incorporating a superconducting coil capable of reducing influence of magnetic noise derived from a cold storage material is provided.

Solution to Problem

The cold storage material of embodiments is a granular body composed of an intermetallic compound in which a $ThCr_2Si_2$-type structure compound occupies 80% by volume or more, and has a crystallite size of 70 nm or less.

BRIEF DESCRIPTION OF DRAWINGS

FIG. 8 is a table showing crystallite size, volume % of the $ThCr_2Si_2$-type structure, proportion of each pulverized sample, peak temperature of specific heat, and peak values of specific heat for intermetallic compounds of $DyCu_2Ge_2$, $DyCu_2Si_2$, $GdCu_2Si_2$, $PrCu_2Si_2$, and $TbCu_2Si_2$ in Example 1 to Example 7 and Comparative Example 1 to Comparative Example 14.

DETAILED DESCRIPTION

First Embodiment

Figure 1:
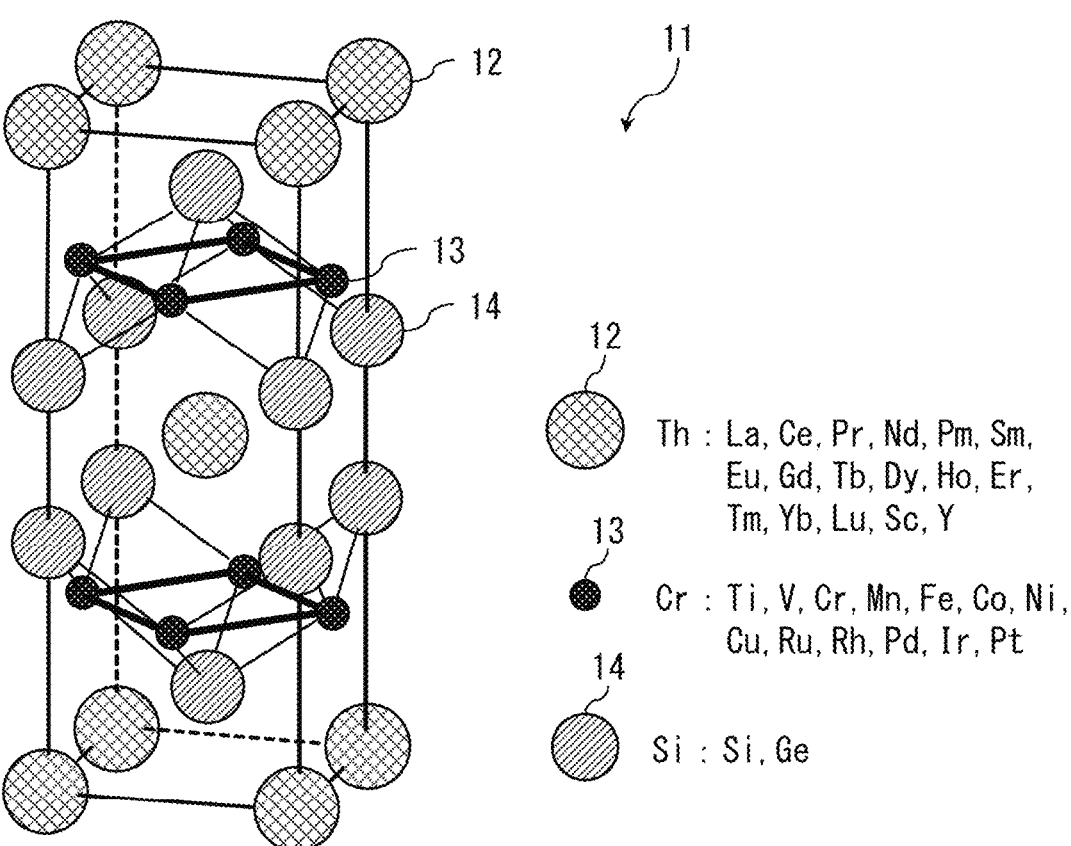
FIG. 1 is a model diagram of a $ThCr_2Si_2$-type structure showing a crystal structure of a cold storage material according to the first embodiment.

Hereinafter, embodiments will be described in detail. FIG. 1 is a model diagram of a $ThCr_2Si_2$-type structure 11 showing the crystal structure of the cold storage material according to the first embodiment. The cold storage material according to the first embodiment is a granular body composed of an intermetallic compound in which $ThCr_2Si_2$-type structure 11 occupies 80% by volume or more, and has a crystallite size of 70 nm or less.

In the above-described $ThCr_2Si_2$-type structure 11, Th site 12 is at least one element selected from the group consisting of La, Ce, Pr, Nd, Pm, Sm, Eu, Gd, Tb, Dy, Ho, Er, Tm, Yb, Lu, Sc, and Y. In the above-described $ThCr_2Si_2$-type structure 11, Si site 14 is at least one element selected from Si and Ge, and Cr site 13 is at least one element selected from the group consisting of Ti, V, Cr, Mn, Fe, Co, Ni, Cu, Ru, Rh, Pd, Ir, and Pt.

In a refrigerator such as a GM refrigerator described below, a working gas such as He gas fluidly reciprocates through the gap of the cold storage materials which fill the cold storage device, the low temperature generated by the compression/expansion cycle of the gas is stored in the cold storage material, and thereby, the refrigerator cools down from a room temperature to an extremely low temperature. Thus, the cold storage material to be mounted on the refrigerator is required to have a large specific heat characteristic in the operating temperature region.

When the $ThCr_2Si_2$-type structure 11 occupies 80% by volume or more in this intermetallic compound, the intermetallic a cold storage material having a high specific heat characteristic in an extremely low temperature region can be obtained. If the proportion of the $ThCr_2Si_2$-type structure 11 in the intermetallic compound is less than 80% by volume, the specific heat characteristic is deteriorated in some cases compared with general substances listed as cold storage materials in the extremely low temperature region. The volume % of the $ThCr_2Si_2$-type structure can be calculated from the Rietveld analysis of the powder X-ray diffraction method and/or evaluation of the ratio of the phases of a plurality of fields of view by observation with a scanning electron microscope.

In a GM refrigerator and a Stirling refrigerator, the cold storage device filled with the cold storage material vibrates, and thus, the cold storage material is required to have mechanical strength. Thus, crystallite size of the cold storage material is as fine as 70 nm or less, which ensures excellent mechanical strength of the cold storage material. The crystallite size L is calculated by evaluating the peak width (half width) β in the X-ray diffraction pattern and using Scherrer's equation (Equation (1)). When the crystallite size is small, the half width of the X-ray diffraction pattern becomes large.

$$L=K\lambda/(\beta \cos \theta) \tag{1}$$

(wherein K is the Scherrer constant and λ is wavelength of X-rays to be used)

The mechanical strength can be evaluated by a vibration test.

If the crystallite size of the cold storage material is larger than 70 nm, the mechanical strength is reduced, the granules are fatigue-fractured and pulverized as the period of use elapses, and the predetermined performance of the refrigerator cannot be maintained. The crystallite size is preferably 1 nm or more, more preferably 10 nm or more.

Figure 2:
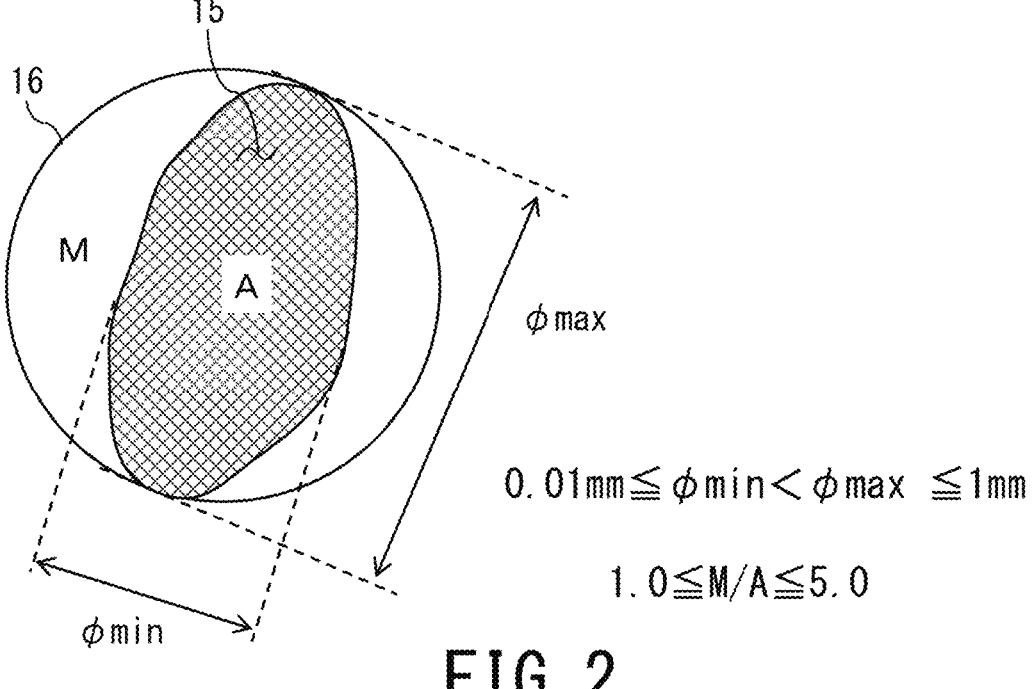
FIG. 2 is a schematic diagram showing a grain shape of the cold storage material according to the first embodiment.

FIG. 2 is a schematic diagram showing a grain shape of the cold storage material according to the first embodiment. As the particle size of the granular body of the cold storage material, φmax is defined as the length of the granular body in the longest direction and φmin is defined as the length of the longest portion in the direction perpendicular to the longest direction. φmax and φmin are included in the range of 0.01 mm to 1 mm, and more preferably, φmax and φmin are included in the range of 0.05 mm to 0.5 mm. When an area of a projected image 15 of this cold storage material is defined as A and an area of the smallest circumscribed circle 16 circumscribing this projected image 15 is defined as M, the shape coefficient represented by M/A is included in the range of 1.0 to 5.0 in every projection direction.

Since the particle size of the cold storage material is included in the range of 0.01 mm to 1 mm, in the refrigerator described below, the flow of the working gas (He gas) that fluidly reciprocates in the cold storage device filled with cold storage material is not obstructed, and satisfactory heat exchange between the working gas and the cold storage material is achieved. When the particle size of the cold storage material is less than 0.01 mm (10 μm), the gap between the particles of the cold storage material (i.e., space through which the working gas flows) may be narrowed and the pressure loss of the gas may increase. When the particle size of the cold storage material is larger than 1 mm, the filling rate of the cold storage material in the cold storage device may decrease and the heat exchange between the working gas and the cold storage material may decrease.

The production of such a cold storage material is performed by at least going through a process of blending and melting the component elements of an intermetallic compound, which can form the above-described $ThCr_2Si_2$-type structure 11, at its stoichiometric ratio and a process of injecting this molten liquid into a dynamic cooling medium and rapidly cooling and solidifying it into granules.

That is, the elemental metal blended to have the stoichiometric ratio of the $ThCr_2Si_2$-type structure 11 is melted by high frequency induction heating or the like. Further, the molten metal is supplied to the surface of a high-speed rotating body installed in the atmosphere of vacuum or inert gas. This molten metal is finely dispersed by the motion of the rotating body and is simultaneously subjected to rapid-solidification so as to form spherical granules. Additionally or alternatively, the above-described molten metal is made to flow out into a vacuum or an atmosphere of inert gas, and a non-oxidizing atomizing gas is allowed to act on it. As a result, the molten metal is atomized and dispersed, and at the same time, is rapidly cooled and solidified to form spherical granules.

Specific methods for rapidly cooling and solidifying the above-described molten metal include a rotary disc process (RDP) method, a single roll method, a double roll method, an inert gas atomizing method, and a rotary nozzle method. According to these methods, the molten metal can be rapidly cooled at a cooling rate of $10^5$ to $10^{6\circ}$ C./s, and thus, an intermetallic compound having the $ThCr_2Si_2$-type structure can be readily produced in the form of granules at low cost. Details of the rapid-solidification method for the molten metal are described in Japanese Patent No. 2609747.

When an intermetallic compound having a different magnetic-phase transition-temperature is added to the intermetallic compound having the $ThCr_2Si_2$-type structure, the specific heat characteristic per unit volume of the cold storage material can be enhanced. For example, when a phase having an $AlB_2$-type structure and a $LiGaGe$-type structure is present in the intermetallic compound having the $ThCr_2Si_2$-type structure, the specific heat in the 4K to 20K region can be increased. When a phase having a $Gd_3Cu_4Ge_4$-type structure is present in the intermetallic compound having the $ThCr_2Si_2$-type structure, the specific heat in the vicinity of 7K to 50K can be increased. However, when the amount of the phases excluding the $ThCr_2Si_2$-type structure is 20% by volume or more, the volume specific heat derived from the $ThCr_2Si_2$-type structure becomes small. When the intermetallic compound is composed of phases having different crystal structures, the mechanical strength of the cold storage material can be increased.

Second Embodiment

Figure 3:
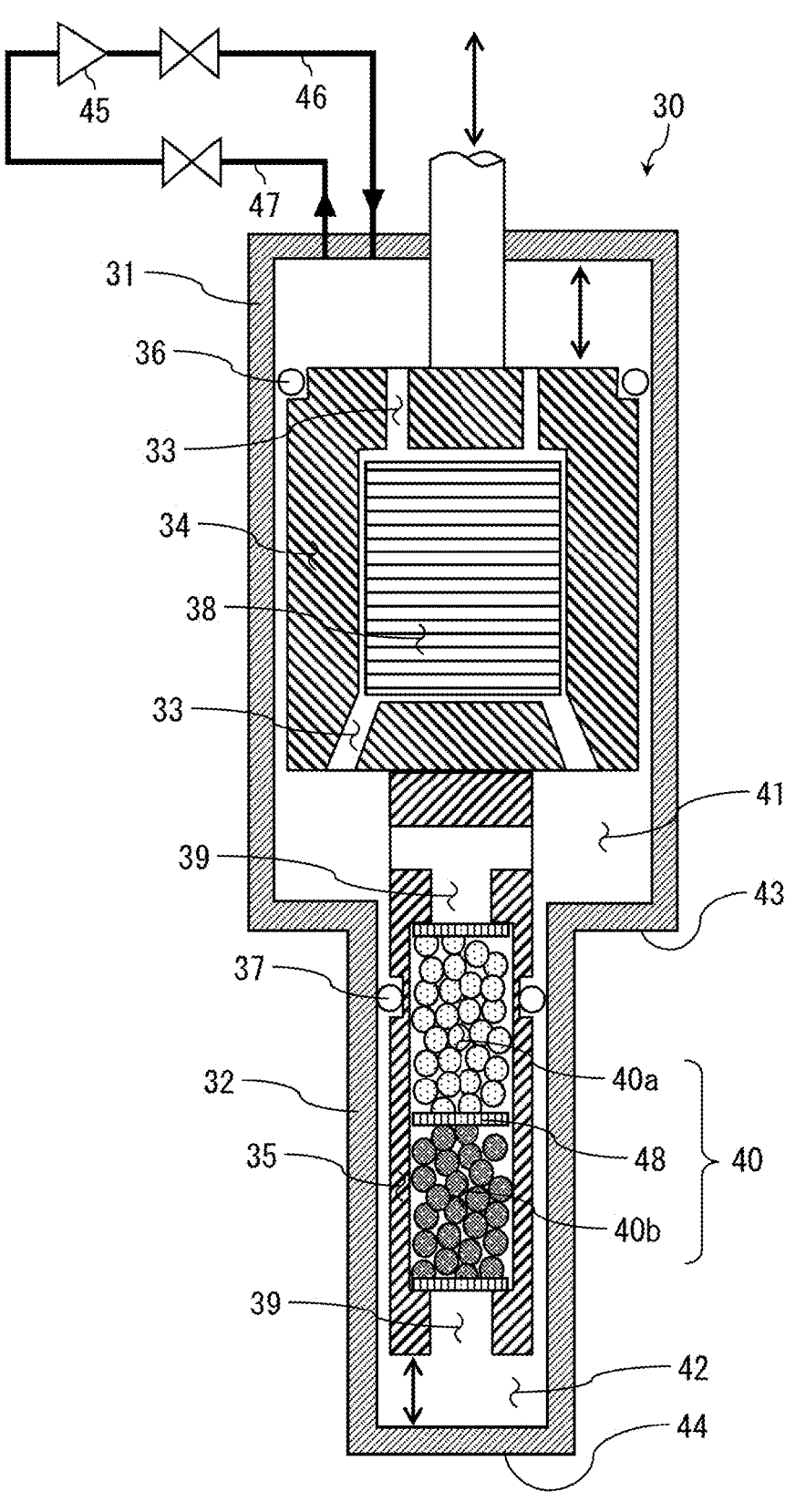
FIG. 3 is a cross-sectional view of a two-stage expansion type GM refrigerator exemplified as the refrigerator according to the second embodiment.

FIG. 3 is a cross-sectional view of a two-stage expansion type GM refrigerator exemplified as the refrigerator 30 according to the second embodiment. The refrigerator 30 includes: a large-diameter first cylinder 31; and a small-diameter second cylinder 32 that is coaxially connected to the first cylinder 31. A first cold storage device 34 is disposed in the first cylinder 31 so as to be able to reciprocate, and a second cold storage device 35 is disposed in the second cylinder 32 so as to be able to reciprocate. A seal ring 36 is disposed between the first cylinder 31 and the first cold storage device 34, and a seal ring 37 is disposed between the second cylinder 32 and the second cold storage device 35.

A first expansion chamber 41 is provided between the inner wall of the first cylinder 31 and the connection portion of the first and second cold storage devices 34 and 35. A second expansion chamber 42 is provided between the second cold storage device 35 and the tip wall of the second cylinder 32. A first cooling stage 43 is formed at the bottom of the first expansion chamber 41, and a second cooling stage 44 being lower in temperature than the first cooling stage 43 is formed at the bottom of the second expansion chamber 42.

In the first cold storage device 34, a first cold storage material 38 such as a copper alloy mesh is accommodated under the state where a passage 33 of the working gas (He gas, and the like) is secured. As the first cold storage material 38, a stainless steel mesh may be used instead of the copper alloy mesh, and both of them may be used. The second cold storage device 35 is filled with second cold storage materials 40 in a form in which the passage 39 of the working gas is secured. Although a description has been given of the cold storage devices 34 and 35 in which the first cold storage material 38 and the second cold storage materials 40 are packed separately, these may be packed in one cold storage device.

The second cold storage materials 40 to be housed inside the second cold storage device 35 are filled with a plurality of types of second cold storage materials 40a and 40b such that these second cold storage materials 40a and 40b are partitioned by a mesh 48. The filling rate of the second cold storage materials 40a and 40h in the space partitioned by the mesh 48 is preferably 50% to 75% in consideration of the fluidity of the working gas, and is more preferably 55% to 65%.

In the two-stage refrigerator 30, the working gas (He gas or the like) is compressed by a compressor 45 and supplied to the refrigerator 30 through a high-pressure line 46. The supplied working gas passes through the gap of the first cold storage material 38 housed in the first cold storage device 34 so as to reach the first expansion chamber 41, and then cools the first cooling stage 43 by expansion. Next, the working gas passes through the gap of the second cold storage materials 40 housed in the second cold storage device 35 so as to reach the second expansion chamber 42, and then cools the second cooling stage 44 by expansion.

The working gas having been made into low-pressure state passes through the second cold storage device 35 and the first cold storage device 34 in this order (i.e., in the order opposite to the case of the high-pressure), and then is returned to the compressor 45 through a low-pressure line 47. Afterward, it is compressed by the compressor 45 and the above-described cycle is repeated. The expansion of each of the expansion chambers 41 and 42 is realized by the reciprocating operation of the cold storage devices 34 and 35. At this time, each of the cold storage materials 38 and 40 exchanges heat energy with the working gas so as to accumulate and retain cold heat, and also performs heat regeneration.

Next, the cycle will be described focusing on the heat flow. The high-pressure working gas to be supplied from the compressor 45 to the refrigerator 30 is at room temperature (about 300K). This working gas is precooled by the first cold storage material 38 while passing through the first cold storage device 34, and then reaches the first expansion chamber 41. Afterward, the working gas expands in the first expansion chamber 41 so as to be further lowered in temperature and thereby cools the first cooling stage 43. Subsequently, the working gas is precooled by the second cold storage materials 40 while passing through the second cold storage device 35, and then reaches the second expansion chamber 42. Afterward, the working gas expands in the second expansion chamber 42 so as to be further lowered in temperature and thereby cools the second cooling stage 44.

The working gas having been made into the low-pressure state passes through the inside of the second cold storage device 35 while storing cold heat in the second cold storage materials 40 (i.e., while the working gas itself is being warmed).

Subsequently, the working gas passes through the inside of the first cold storage device 34 so as to be warmed to near room temperature while storing cold heat in the first cold storage material 38 (i.e., while the working gas itself is being warmed), and then passes through the low-pressure line 47 so as to return to the compressor 45.

During the steady operation of the refrigeration cycle, a temperature gradient occurs in the cold storage materials 38 and 40 inside the cold storage devices 34 and 35.

In such a refrigeration cycle, the larger the specific heat of the cold storage material at the operating temperature is, the higher the thermal efficiency of the working gas cycle becomes, which achieves lower temperature and higher refrigeration performance.

In general, specific heat of a solid has the property of changing depending on the temperature. Thus, in particular, in order to enhance the heat recovery effect of the second cold storage materials 40, it is effective to selectively dispose the second cold storage materials 40 having satisfactory heat recovery characteristics in the respective temperature regions depending on the temperature gradient. Hence, the second cold storage device 35 is filled with a plurality of second cold storage materials 40 (40a, 40b) having different heat recovery characteristics.

In order to obtain a satisfactory heat recovery effect, the following characteristic are important. That is, the heat capacity (specific heat) of the cold storage material at the operating temperature of each portion in the cycle process is large, and the heat exchange between the cold storage materials 40 and 38 and the working gas is satisfactory. In the first cold storage device 34, the temperature region from room temperature to 100K or less is the main operating temperature region, and thus, Cu having a large specific heat per unit volume in this temperature region is selected. Further, Cu mesh is widely used as the first cold storage material 38 because mesh subjected to wire-drawing process is industrially easy to use.

Pb and Bi, which have a higher specific heat at 60K or less than Cu, are selected as the second cold storage material 40a on the high-temperature side of the second cold storage device 35. The cold storage material having the $ThCr_2Si_2$-type structure according to the first embodiment, which has a higher specific heat at 8K or less than Pb and Bi, is selected as the second cold storage material 40b on the low-temperature side of the second cold storage device 35. In consideration of the temperature gradient inside the cold storage devices 34 and 35, for the cold storage materials 38 and 40 of the GM refrigerator, it is preferred to select and dispose substances having a large volume specific heat in the operating temperature region of each portion in the above-described manner. Note that the second cold storage material 40a to be disposed on the high-temperature side of the second cold storage device 35 is not limited to Pb and Bi. $HoCu_2$, $Er_3Ni$, and the like may be disposed as the second cold storage material 40a. Additionally, the second cold storage materials 40 are not limited to the above-descried two layers but may be formed of three or more layers.

Further, the refrigerator equipped with the cold storage material according to the first embodiment is not limited to the above-described GM refrigerator. In refrigerators configured to generate an extremely low temperature from a room temperature, such as a pulse tube refrigerator, a Claude refrigerator, and a Stirling refrigerator, the cold storage materials are disposed at portions where a large thermal impedance is required, such as the boundary region between the cold and hot portions to be caused by the compression/expansion cycle of the working gas.

Third Embodiment

Figure 4:
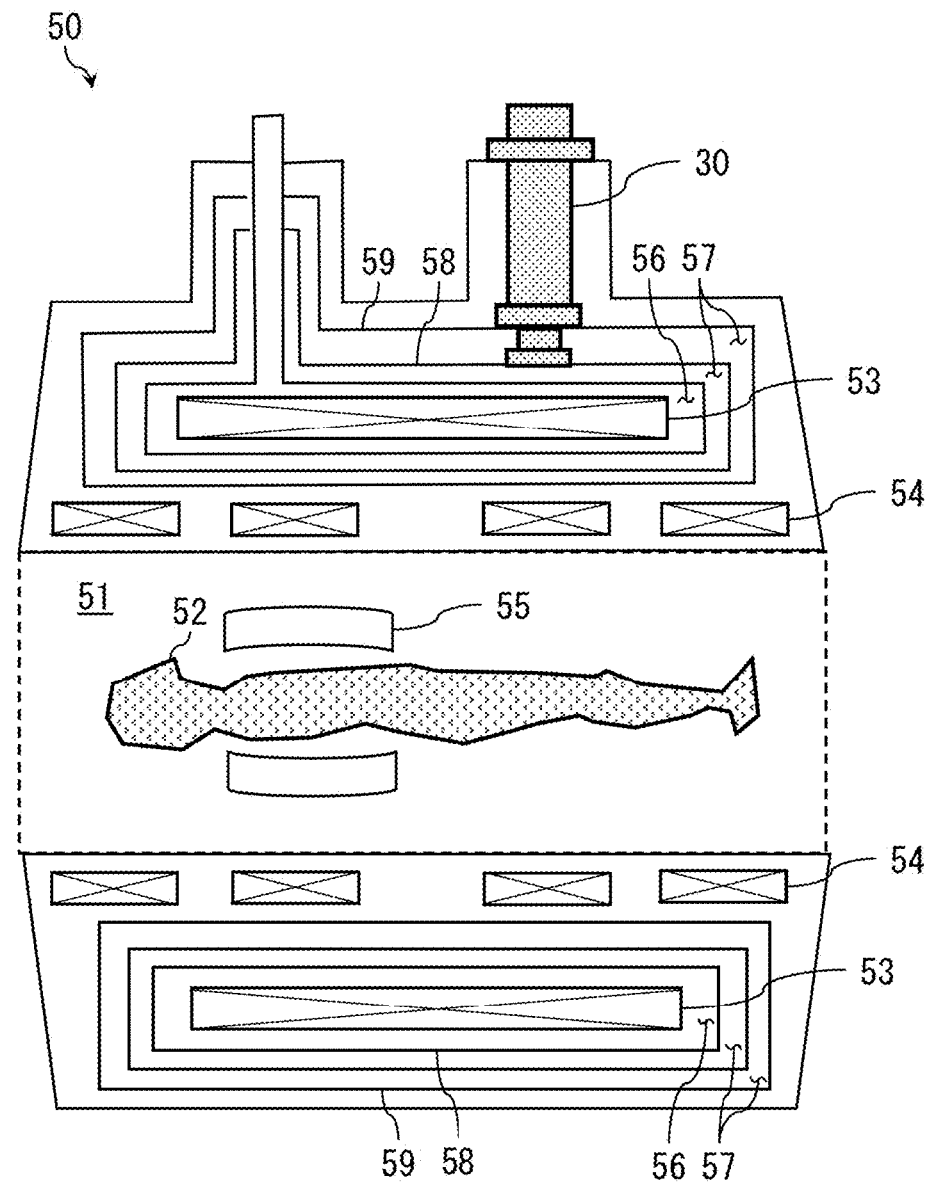
FIG. 4 is a cross-sectional view of an MRI apparatus exemplified as a device incorporating a superconducting coil according to the third embodiment.

FIG. 4 is a cross-sectional view of a magnetic resonance imaging (MRI) apparatus 50 exemplified as a device incorporating a superconducting coil according to the third embodiment. In the diagnosis by this MRI apparatus 50, a movable base (not shown) on which a subject 52 lies is moved into a tunnel-shaped bore space 51. Further, a static magnetic field is applied by a first electromagnet 53, and a gradient magnetic field is applied by the second electromagnet 54.

Further, a radio wave is transmitted from an RF coil 55, and a magnetic resonance signal is received as a response signal from the subject 52. Due to the gradient magnetic field, positional information on the position where the response signal is generated is also received at the same time. The received response signals are analyzed by a signal processing system (not shown) to reconstruct an internal image of the body of the subject 52.

In the MRI apparatus 50 currently used as the mainstream, a superconducting coil configured to generates a strong magnetic field such as 1.5 T and 3 T is used for the first electromagnet 53. The stronger the magnetic field is, the better the S/N (signal/noise) ratio of the magnetic resonance response signal becomes, which enables generation of a clearer image. As the superconducting coil to be used for the first electromagnet 53, a solenoid coil wound with metal-type low-temperature superconducting wires such as NbTi and $Nb_3Sn$ is usually used.

Since these wires need to be kept at the critical temperature of the superconducting transition or lower, the first electromagnet 53 is installed in a He bath 56 filled with liquid He that liquefies at 4.2K (about −269° C.) or less under 1 atm. Since the liquid He is rare and expensive, an adiabatic vacuum layer 57 is provided on the outside of the He bath 56 in order to suppress evaporation of the liquid He. Further, in order to reduce the influence of heat intrusion from the environment (room temperature: about 300K) in which the MRI apparatus 50 is installed, two radiation shields 58 and 59 are provided in the adiabatic vacuum layer 57. The shield 58 is cooled to about 4K and the shield 59 is cooled to about 40K by the installed refrigerator 30.

The refrigerator 30 is not limited to a particular one, and a GM refrigerator and a JT refrigerator may be used in combination as the refrigerator 30. Additionally or alternatively, a refrigerator such as a GM refrigerator, a pulse tube refrigerator, a Claude refrigerator, and a Sterling refrigerator is used alone as the refrigerator 30 in some cases. In particular, the GM refrigerator has significantly improved in refrigeration performance by being equipped with a magnetic cold storage material in the 1990s, which has enabled generation of an extremely low temperatures below the liquid He temperature by using only the GM refrigerator. Thus, the GM refrigerator is often used in the MRI apparatus 50, which is widely used at the time of filing of the present application.

As shown in FIG. 4, the first cooling stage 43 (FIG. 3) of the GM refrigerator 30 is connected to the shield 59, and the second cooling stage 44 (FIG. 3) is connected to the shield 58. At the time of filing of the present application, GM refrigerators capable of stably obtaining a refrigeration capacity of 1 W or more at 4K are widespread. Thus, the heat invasion into the He bath 56 and the cooling by the GM refrigerator 30 are balanced, and thereby, an extremely low temperature can be maintained and evaporation of the liquid He can be almost completely suppressed.

Consequently, in medical institutions such as hospitals, when the liquid He is injected at the initial start-up of the MRI apparatus 50, it is not necessary to regularly add the liquid He, which is expensive and not easy to handle, in the subsequent operation. Due to this significant improvement in convenience, the introduction of MRI apparatus 50 to small and medium-sized hospitals is expanding. In addition, an MRI apparatus including a direct cooling type superconducting coil, which conducts and cools the superconducting coil with a refrigerator without using the liquid He, has also been commercialized. In the case of such an MRI apparatus, the liquid He bath 6 can be omitted.

In recent years, MRI apparatuses using high-temperature superconducting wires such as Y-type, Bi-type, and $MgB_2$ have been developed. In also these apparatuses similarly to the MRI apparatus using a low-temperature superconducting material, the superconducting coil needs to be equal to or lower than the critical temperature of the superconducting transition and needs to be cooled below 10K to 30K (about $-257°$ C.) at which the current required to generate the magnetic field can flow.

Thus, in the MRI apparatus using a high-temperature superconducting material, it is necessary to cool the superconducting coil by applying conduction cooling on the superconducting coil with the use of a refrigerator or by submerging it in liquid He, liquid $H_2$, and/or liquid Ne, liquefaction temperature of each of which is 4K to 30K (about $-269°$ C.) or lower under 1 atm. Also in the latter method, it is desirable to cool it by using a refrigerator in order to prevent evaporation of liquids He, liquid $H_2$, and liquid Ne. In order to improve the performance of the refrigerator at 10K to 30K, it is preferred to mount a cold storage material having a large specific heat in the same temperature region on the refrigerator.

The device incorporating a superconducting coil (i.e., an apparatus with a built-in superconducting-coil) according to the third embodiment is equipped with the refrigerator of the second embodiment, which is provided with the cold storage material of the first embodiment. The magnetization of this cold storage material is 10 emu/g or less, more preferably 5 emu/g or less, and further preferably 2 emu/g or less at an external magnetic field of 1000 Oe and a temperature of 5K or lower. Since the magnetization of the cold storage material is small as described above, the influence of magnetic noise derived from the cold storage material can be reduced and a high-quality image can be obtained. The device incorporating a superconducting coil according to the third embodiment is not limited to the above-described MRI apparatus 50. The device incorporating a superconducting coil according to the third embodiment includes a superconducting magnet for a magnetically levitated train, a superconducting magnet device, a cryopump device, a Josephson voltage standard device, and a magnetic-field application type monocrystal pulling device.

In particular, the cryopump device achieves a high degree of vacuum by being cooled to about 10K. Thus, the performance of the cryopump device can be improved by mounting a cold storage material having a large specific heat in the vicinity of 10K on the refrigerator.

EXAMPLES

Example 1, Comparative Example 1

Next, Example 1 will be described in more detail. The elemental metals, which are components of the intermetallic compound $DyCu_2Ge_2$, are used as the raw materials and are mixed in its stoichiometric ratio so as to be melted. Further, the distance between the nozzle and the roll is set to 0.5 mm under the roll quenching method, and a flaky sample was prepared by rapid-solidification at a cooling rate of $10^{5°}$ C./sec to $10^{6°}$ C./sec. As Comparative Example 1, a bulk sample was prepared by slowly cooling and solidifying the raw materials at a cooling rate of $10^{2°}$ C./sec using the arc melting method under the same compounding and melting conditions as Example 1.

Example 2

A flaky sample was prepared under the same conditions as in Example 1 except that the distance between the nozzle and the roll was set to 0.6 mm.

Example 3

A flaky sample was prepared under the same conditions as in Example 1 except that the distance between the nozzle and the roll was set to 0.7 mm.

Figure 5:
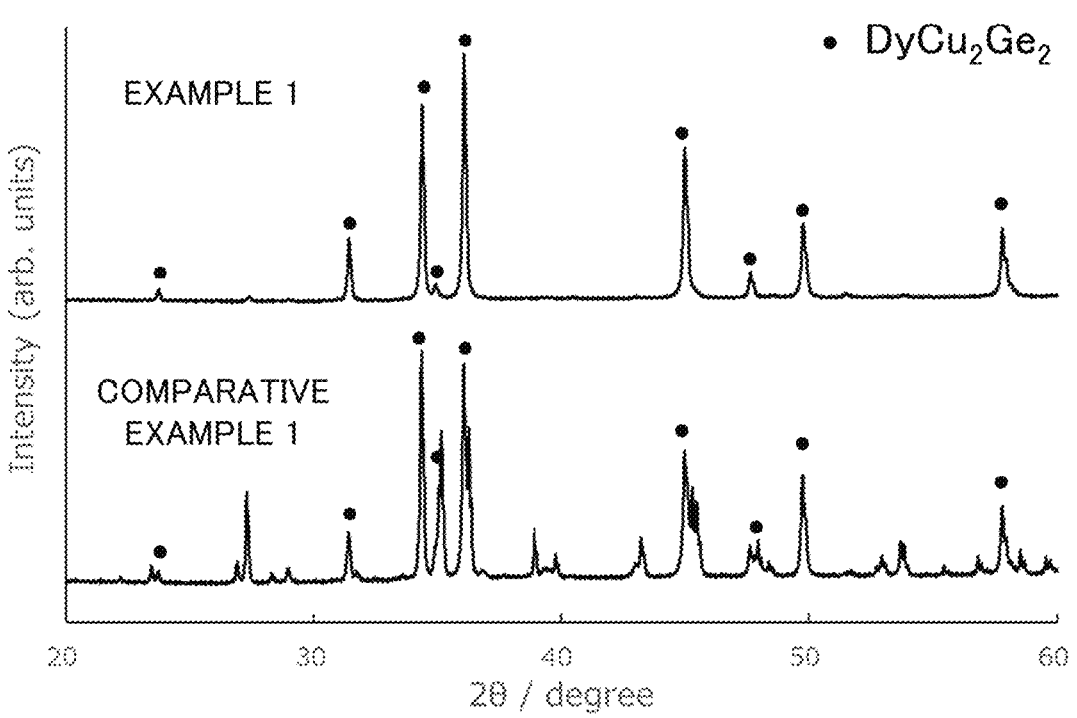
FIG. 5 is a graph showing measurement results by a powder X-ray diffraction method for Example 1 in the upper part and for Comparative Example 1 in the lower part.

FIG. 5 is a graph showing measurement results by a powder X-ray diffraction method for Example 1 in the upper part and for Comparative Example 1 in the lower part. The measurement of the powder X-ray diffraction was performed by using SmartLab manufactured by Rigaku Co., Ltd. From the X-ray diffraction pattern of this graph, it can be seen that most of the crystal structure of the intermetallic compound of Example 1 obtained by the rapid-solidification treatment is $DyCu_2Ge_2$. It can be seen that the intermetallic compound of Comparative Example 1 obtained by the slow-cooling solidification treatment also contains a plurality of sub-phases.

Figure 6:
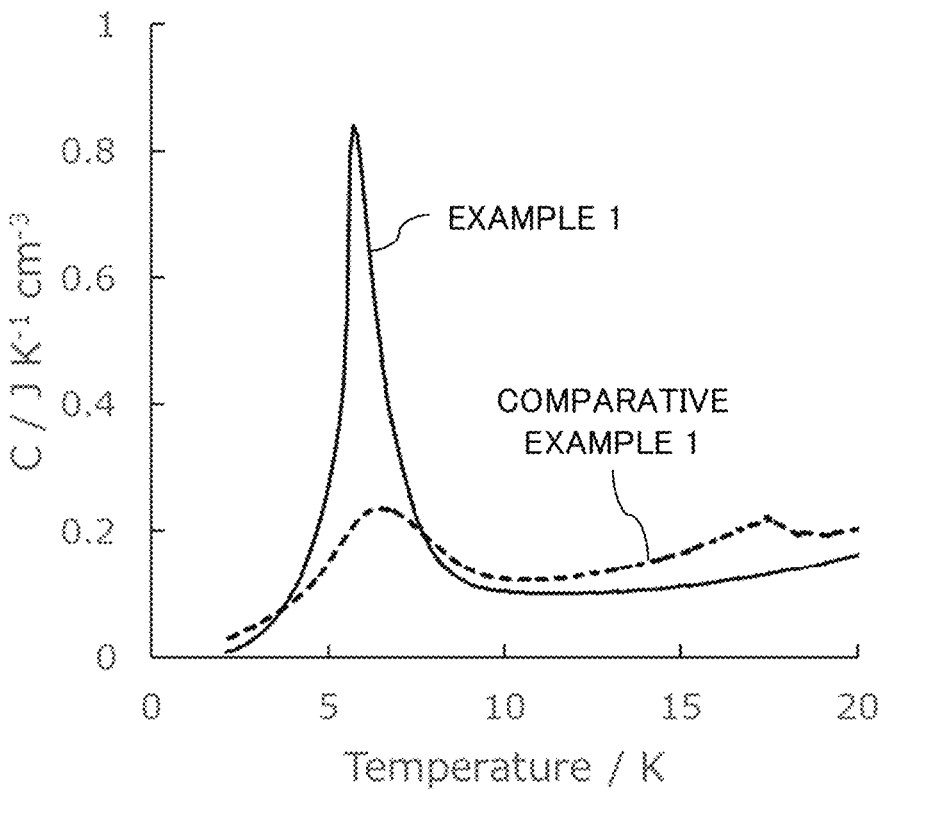
FIG. 6 is a graph showing the specific heat characteristics of Example 1 and Comparative Example in an extremely low temperature region.

FIG. 6 is a graph showing the specific heat characteristics of Example 1 and Comparative Example in the extremely low temperature region. The specific heat characteristics were measured with the use of a physical property measurement system (PPMS) manufactured by Quantum Design Japan, Inc. As shown in FIG. 6, it can be seen that Example 1 subjected to the rapid-solidification treatment is larger in local maximum value of the specific heat in the low temperature region than Comparative Example 1 subjected to the slow-cooling solidification treatment. As a result, the cooling capacity of the refrigerator is improved by adopting the intermetallic compound of Example 1 as the cold storage material to be packed in the cold storage device of the refrigerator.

Comparative Example 2

Under the same compounding and melting conditions as in Comparative Example 1, a bulk sample was prepared by heat treatment at $800°$ C. below the solidifying point for one week. The sample preparation conditions of Comparative Example 2 reproduce the above-described disclosure conditions of Non-Patent Document 1.

Comparative Example 3

A bulk sample was prepared under the same conditions as in Comparative Example 2 except that the heat treatment was performed at $900°$ C. below the solidifying point for four days.

Comparative Example 4

A bulk sample was prepared under the same conditions as in Comparative Example 2 except that the heat treatment was performed at $800°$ C. below the solidifying point for four days.

Comparative Example 5

A bulk sample was prepared under the same conditions as in Comparative Example 2 except that the heat treatment was performed at 700° C. below the solidifying point for four days.

Comparative Example 6

Under the same compounding conditions as in Example 1, a bulk sample was prepared by performing slow-cooling solidification at a cooling rate of $10^{2°}$ C./sec under the high-frequency dissolution method.

Example 4

A flaky sample was prepared under the same conditions as in Example 1 except that the composition was $DyCu_2Si_2$.

Comparative Example 7

A bulk sample was prepared under the same conditions as in Comparative Example 1 except that the composition was $DyCu_2Si_2$.

Comparative Example 8

A bulk sample was prepared under the same conditions as in Comparative Example 7 except that the heat treatment was performed at 900° C. below the solidifying point for four days.

Example 5

A flaky sample was prepared under the same conditions as in Example 1 except that the composition was $GdCu_2Si_2$.

Comparative Example 9

A bulk sample was prepared under the same conditions as in Comparative Example 1 except that the composition was $GdCu_2Si_2$.

Comparative Example 10

A bulk sample was prepared under the same conditions as in Comparative Example 9 except that the heat treatment was performed at 900° C. below the solidifying point for four days.

Example 6

A flaky sample was prepared under the same conditions as in Example 1 except that the composition was $PrCu_2Si_2$.

Comparative Example 11

A bulk sample was prepared under the same conditions as in Comparative Example 1 except that the composition was $PrCu_2Si_2$.

Comparative Example 12

A bulk sample was prepared under the same conditions in Comparative Example 11 except that the heat treatment was performed at 900° C. below the solidifying point for four days.

Example 7

A flaky sample was prepared under the same conditions as in Example 1 except that the composition was $NdCu_2Si_2$.

Comparative Example 13

A bulk sample was prepared under the same conditions as in Comparative Example 1 except that the composition was $NdCu_2Si_2$.

Comparative Example 14

A bulk sample was prepared under the same conditions as in Comparative Example 13 except that the heat treatment was performed at 900° C. below the solidifying point for four days.

Figure 7:
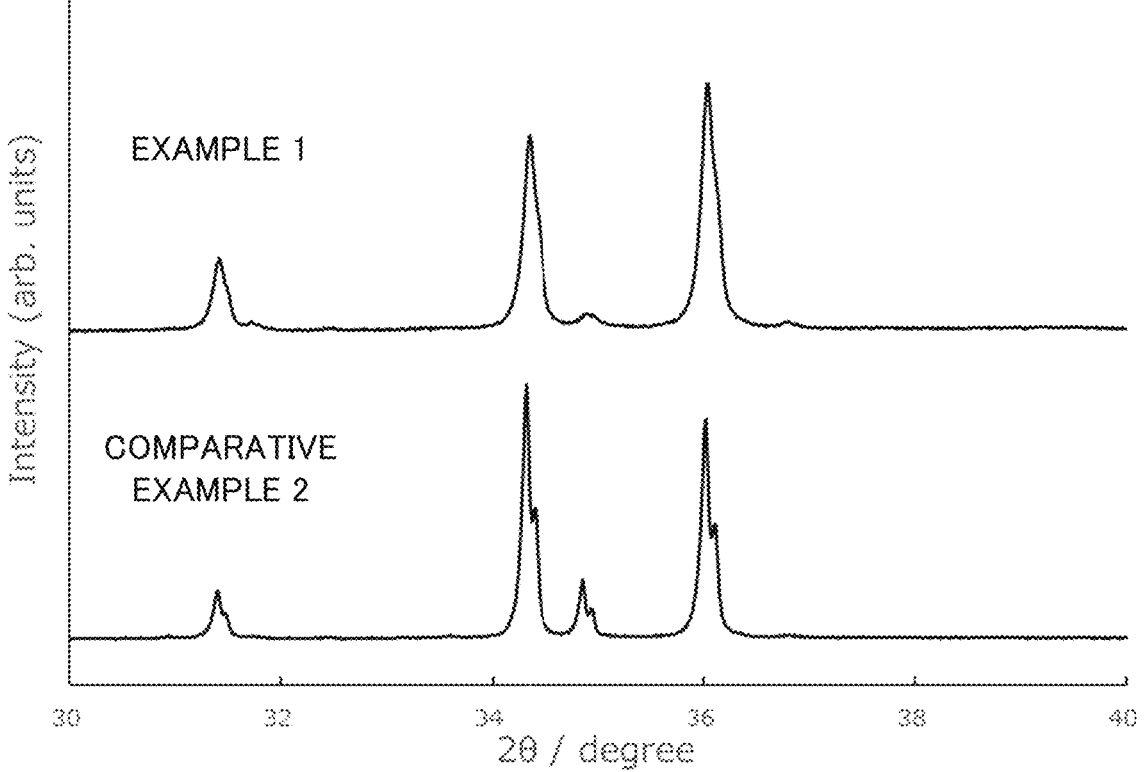
FIG. 7 is a graph showing measurement results by the powder X-ray diffraction method for Example 1 in the upper part and for Comparative Example 2 in the lower part.

FIG. 7 is a graph showing measurement results by the powder X-ray diffraction method for Example 1 in the upper part and for Comparative Example 2 in the lower part. Example 1 shown in the upper part of FIG. 7 and Example 1 shown in the upper part of FIG. 5 are the same data except the scale display on the horizontal axis. As shown in FIG. 7, it can be seen in Comparative Example 2 that the X-ray diffraction pattern of the unintended crystal structure being present in Comparative Example 1 disappears and most of the crystal structure becomes $DyCu_2Ge_2$ similarly to Example 1 by maintaining a high temperature and heat-treating the solid phase.

Comparing the X-ray diffraction patterns in FIG. 7 between Example 1 and Comparative Example 2, it can be seen that the peak spread is larger in Example 1. The peak identified as $ThCr_2Si_2$-type structure was used for calculating the crystallite size from the half width β. Even if the crystal structure of the intermetallic compound is the same, Example 1 subjected to rapid-solidification treatment is smaller in crystallite size than Comparative Example 2 subjected to heat-treatment at a high temperature in a solid phase, and has excellent mechanical properties.

The samples were put into a container (D=15 mm, h=14 mm) of a vibration tester, and a simple vibration with a maximum acceleration of 300 m/s$^2$ was applied $1\times10^6$ times by the vibration tester. After this test, the mechanical strength of each sample was evaluated by appropriately classifying the samples in terms of shape and sieving the samples and by determining the weight ratio of each pulverized sample.

FIG. 8 is a table of results showing crystallite size, content percentage of $ThCr_2Si_2$-type structure, proportion of pulverized sample, peak temperature of specific heat, and peak value of specific heat in the samples of Example 1 to Example 7 and Comparative Example 1 to Comparative Example 14. When the crystallite size is larger than 70 nm, the proportion of pulverization is significantly increased and the mechanical strength is reduced. When the content percentage of the $ThCr_2Si_2$-type structure is less than 801; by volume, the peak value of specific heat is significantly reduced.

Figure 9:
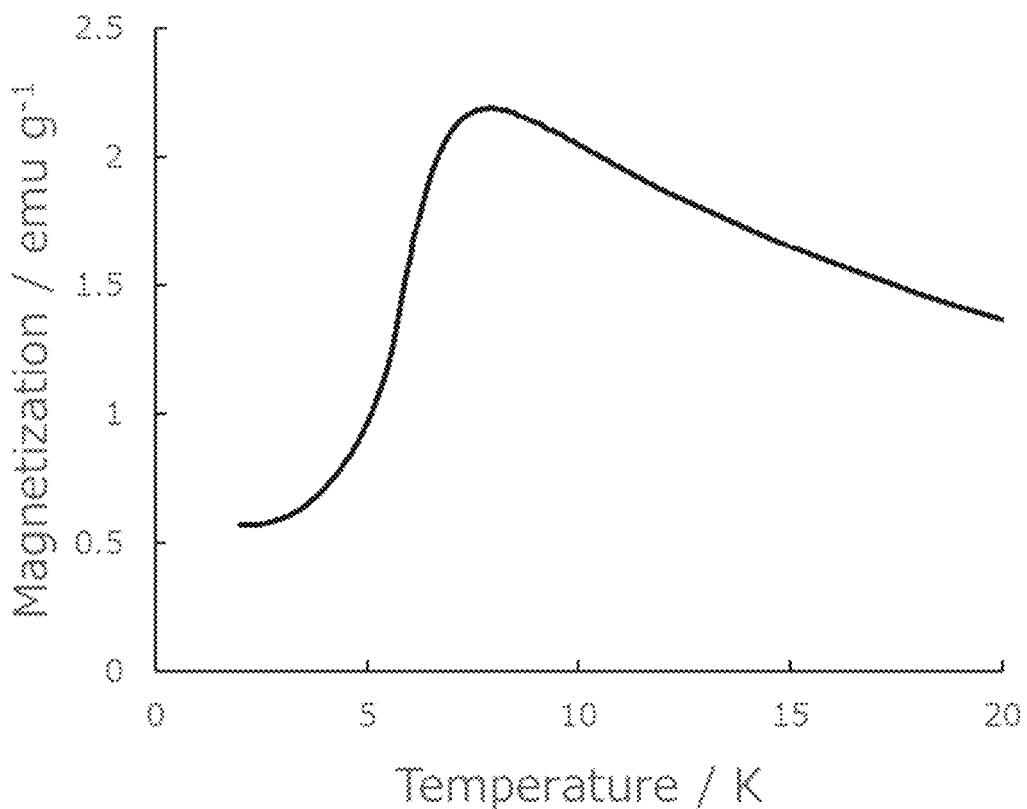
FIG. 9 is a graph showing magnetization characteristics in an extremely low temperature region of Example 1.

FIG. 9 is a graph showing the magnetization characteristics in the extremely low temperature region for Example 1 The magnetization characteristics were measured with the use of a magnetic property measurement system (MPMS) manufactured by Quantum Design Japan, Inc. When the external magnetic field is 1000 Oe, the magnetization in the temperature region 2K to 5K is 0.97 emu/g or lower. The magnetization of DOS, which has almost the same high specific heat characteristics as in Examples 1 to 3 in the temperature region near 5K, is 1.5 emu/g, the magnetization of $HoCu_2$ used on the low-temperature side of the second cold storage device excluding GCS is 3.5 emu/g, and the magnetization of $Er_3Ni$ is 7 emu/g. Accordingly, the cold storage materials of Examples 1 to 3 have small magnetization characteristics, and thus contribute to improvement of image quality and reduction of magnetic noise of the device incorporating a superconducting coil when being mounted on an MRI apparatus.

In the case of the cold storage material of Example 1 having a granular particle size below 0.01 mm (10 μm), the gap between the particles of the cold storage material (i.e., space through which the working gas flows) becomes narrower, and the pressure loss of the gas increases, which deteriorates the refrigeration performance. When the granular particle size of the cold storage material is larger than 1 mm, the filling rate of the cold storage material in the cold storage device decreases, and thus the refrigeration performance deteriorates.

According to the cold storage material of at least one embodiment as described above, a cold storage material, which has a large specific heat and a small magnetization in an extremely low temperature region and has satisfactory manufacturability, can be provided. Additionally, a refrigerator having high efficiency and excellent cooling performance can be provided by filling the refrigerator with this cold storage material. Further, a device incorporating a superconducting coil capable of reducing the influence of magnetic noise derived from the cold storage material can be provided.

While certain embodiments have been described, these embodiments have been presented by way of example only, and are not intended to limit the scope of the inventions. These embodiments may be embodied in a variety of other forms, and various omissions, substitutions, and changes may be made without departing from the spirit of the inventions. These embodiments and their modifications are included in the accompanying claims and their equivalents as well as included in the scope and gist of the inventions.

REFERENCE SIGNS LIST

11 $ThCr_2Si_2$-type structure
12 Th site
13 Cr site
14 Si site
15 projected image
16 circumscribed circle
30 refrigerator
31 first cylinder
32 second cylinder
33 passage of working gas
34 first cold storage device
35 second cold storage device 36, 37 seal ring
38 first cold storage material
39 passage of working gas
40 (40a, 40b) second cold storage materials
41 first expansion chamber
42 second expansion chamber
43 first cooling stage
44 second cooling stage
45 compressor
46 high-pressure line
47 low-pressure line
48 mesh
50 MRI apparatus
51 bore space
52 subject
53 first electromagnet
54 second electromagnet
55 RF coil
56 He bath
57 adiabatic vacuum layer
58, 59 shield

The invention claimed is:

1. A method of manufacturing a cold storage material comprising:

a process of blending and melting component elements of an intermetallic compound capable of forming a $ThCr_2Si_2$ crystal structure at a stoichiometric ratio of the intermetallic compound to obtain a molten liquid; and a process of cooling at a cooling rate of $10^5$ to $10^{6\circ}$ C./s, and solidifying the molten liquid into granules comprising the $ThCr_2Si_2$ crystal structure by injecting the molten liquid into a dynamic cooling medium to obtain a granular body, wherein:

the $ThCr_2Si_2$ crystal structure occupies 80% by volume or more in the granular body;

a crystallite size of the granular body is 70 nm or less;

the granular body has a particle size range of 0.01 mm to 1 mm;

a shape coefficient of the granular body, represented by M/A, is in a range of 1.0 to 5.0 in every projection direction, wherein an area of a projected image of the cold storage material is defined as A and an area of a smallest circumscribed circle circumscribing the projected image is defined as M;

the Th site in the $ThCr_2Si_2$ crystal structure is at least one element selected from the group consisting of Ce, Pr, Nd, Pm, Sm, Eu, Gd, Tb, Dy, Tm, Yb, Lu, Sc, and Y;

the Cr site in the $ThCr_2Si_2$ crystal structure is at least one element selected from the group consisting of Ti, V, Fe, Co, Ni, and Cu; and the Si site in the $ThCr_2Si_2$ crystal structure is at least one element selected from Si or Ge.

* * * * *